(12) United States Patent
Raman et al.

(10) Patent No.: US 12,113,812 B2
(45) Date of Patent: Oct. 8, 2024

(54) METHOD FOR DETECTION OF LATERAL MOVEMENT OF MALWARE

(71) Applicant: BULL SAS, Les Clayes-sous-Bois (FR)

(72) Inventors: Ravi Raman, Bangalore (IN); Vinod Vasudevan, Fairfax, VA (US); Harshvardhan Parmar, Herndon, VA (US)

(73) Assignee: BULL SAS, Les Clayes-sous-Bois (FR)

( * ) Notice: Subject to any disclaimer, the term of this patent is extended or adjusted under 35 U.S.C. 154(b) by 211 days.

(21) Appl. No.: 17/842,714

(22) Filed: Jun. 16, 2022

(65) Prior Publication Data
US 2022/0407876 A1    Dec. 22, 2022

(30) Foreign Application Priority Data
Jun. 16, 2021    (EP) .................................... 21179791

(51) Int. Cl.
*H04L 29/06*      (2006.01)
*H04L 9/40*       (2022.01)

(52) U.S. Cl.
CPC ...... *H04L 63/1416* (2013.01); *H04L 63/1425* (2013.01); *H04L 63/145* (2013.01); *H04L 63/20* (2013.01)

(58) Field of Classification Search
CPC ............ H04L 63/1416; H04L 63/1425; H04L 63/145; H04L 63/20; G06F 21/552
See application file for complete search history.

(56) References Cited

U.S. PATENT DOCUMENTS

| | | | |
|---|---|---|---|
| 10,027,694 B1 * | 7/2018 | Gupta | H04L 63/1458 |
| 2014/0269339 A1 | 9/2014 | Jaafar et al. | |
| 2017/0142144 A1 * | 5/2017 | Weinberger | H04L 63/1408 |
| 2017/0360377 A1 * | 12/2017 | Rossi | A61B 5/7253 |
| 2018/0131711 A1 * | 5/2018 | Chen | H04L 43/026 |

(Continued)

OTHER PUBLICATIONS

Bohara et al., "An Unsupervised Multi-Detector Approach for Identifying Malicious Lateral Movement", 2017 IEEE 36th Symposium on Reliable Distributed Systems, Date of Conference: Sep. 26-29 (Year: 2017).*

(Continued)

*Primary Examiner* — Morshed Mehedi
(74) *Attorney, Agent, or Firm* — ARC IP Law, PC; Joseph J. Mayo

(57) ABSTRACT

A method for detecting malware penetrating a network by identifying anomalous communication between at least two systems of the network, carried out by a computer. For each unique combination of Source IP address and destination IP address, the method includes considering a past period, considering the network flow logs stored during said past period, calculating values of a metric based on data of the network flow logs within the past period and at a given frequency, calculating a baseline which consists in calculating an IQR of all metric values calculated during the past period, determining an outlier threshold from the baseline, considering a current period, calculating a new IQR of all metric values calculated during the current period, and classifying the communication between the two systems of the unique combination as an anomalous communication if the IQR of the current period is greater than the outlier threshold.

14 Claims, 4 Drawing Sheets

(56) References Cited

U.S. PATENT DOCUMENTS

2018/0270312 A1* 9/2018 Shah .................... H04L 67/125
2022/0407876 A1* 12/2022 Raman .................. H04L 63/20

OTHER PUBLICATIONS

European Search Report issued in EP21179791.5, dated Dec. 1, 2021 (8 pages).
Proto, et al., "Statistical Model Applied to NetFlow for network Intrusion Detection", Oct. 1, 2010, Transactions on Computational Science XI (13 pages).
Bohara, et al., "An Unsupervised Multi-Detector Approach for Identifying Malicious Lateral Movement", Sep. 26, 2017, 2017 IEEE 36$^{th}$ Symposium on Reliable Distributed Systems (10 pages).

* cited by examiner

| Source IP | Dest IP | Day 1 Sum in Bytes | Day 2 Sum in Bytes | Day 3 Sum in Bytes | Day 4 Sum in Bytes | Day 5 Sum in Bytes | Day 6 Sum in Bytes | Day 7 Sum in Bytes | Model Threshold | Outlier Threshold | Day 8 (Current day) In Bytes | Distance from Outlier Threshold | Outcome |
|---|---|---|---|---|---|---|---|---|---|---|---|---|---|
| 10.10.0.0 | 11.11.0.0 | 3000000 | 4000000 | 6000000 | 5000000 | 4000000 | 7000000 | 3000000 | 3000000 | 4500000 | 5000000 | 11.1 | Outlier – higher than the outlier threshold |
| 12.100.0.0 | 18.11.0.0 | 1000000 | 2000000 | 2000000 | 4000000 | 4000000 | 5000000 | 2000000 | 2000000 | 3000000 | 4000000 | 33.3 | Outlier – higher than the outlier threshold |
| 13.13.0.0 | 14.14.0.0 | 5000000 | 1000000 | 2000000 | 4000000 | 3000000 | 5000000 | 1000000 | 4000000 | 6000000 | 3000000 | -50.0 | Not an Outlier - current day bytes is less than Model Threshold |

FIG. 4

METHOD FOR DETECTION OF LATERAL MOVEMENT OF MALWARE

BACKGROUND OF THE INVENTION

Field of the Invention

Embodiments of the invention relate to a method for detecting malware penetrating a network by identifying anomalous communication.

Description of the Related Art

Malware can penetrate networks through a variety of ways (email phishing, a compromised external drive, an infected personal device, an IT misconfiguration, etc.), once it has gained entry the attack will typically evolve through the different stages of the cyber kill chain. It carries out early reconnaissance, creates a state of persistence, seeks access to the outside world through a Command & Control server, and then initiates a series of lateral movements (access to resources, propagation, privileges, etc.), until it reaches its final goal of data exfiltration, data destruction, or demand for ransom.

An object of one or more embodiments of the invention is to provide a method which is able to find outliers with a minimum of false positives.

Another object of one or more embodiments of the invention is to provide a method which is able to quickly find outliers.

BRIEF SUMMARY OF THE INVENTION

These and other objectives of one or more embodiments of the invention are achieved by providing a method for detecting malware penetrating a network by identifying anomalous communication between at least two systems of the network, the method being carried out by a computer and for each unique combination of source IP address and destination IP address, according to one or more embodiments, comprising the following steps:
  considering a past period,
  considering the network flow logs stored during said past period,
  calculating values of a metric based on data of the network flow logs within the past period and at a given frequency,
  calculating a baseline which consists in calculating an IQR (interquartile range) of all metric values calculated during the past period,
  determining an outlier threshold from the baseline,
  considering a current period,
  considering the network flow logs stored during said current period,
  calculating values of the metric based on data of the network flow logs within the current period,
  calculating an IQR (interquartile range) of all metric values calculated during the current period,
  classifying the communication between the two systems of the unique combination as an anomalous communication if the IQR of the current period is greater than the outlier threshold.

The IQR means interquartile range and is a measure of statistical dispersion, being equal to the difference between 75th and 25th percentiles of a set of ordered data. If Q3 is the 75th percentile and Q1 is the 25th percentile, IQR=Q3−Q1.

The method according to one or more embodiments of the invention can in particular be considered as remarkable as it applies during the lateral movements phase where a malicious attack generates specific types of network traffic and is therefore most vulnerable to detection using an algorithm according to one or more embodiments of the invention.

As the malware attempts to make connections to the various resources within the network towards its final goal, the general behavior of these network resources change. For example, a server which never tried connecting to another server, may initiate a connection under the influence of the malware. When such sudden deviations from the regular behavior happens, the method according to one or more embodiments of the invention is therefore able to identify such anomalies. Thus, hundreds of thousands flow packets are to be analyzed to identify such anomalous behavior.

Once identified, an investigation is made to determine if these anomalous connections made are indeed genuine based on current usage patterns. If this were not true, then it could represent a malware trying to make such connections in its intent to reach the critical assets.

The method according to one or more embodiments of the invention focuses on identifying anomalous communication patterns between two systems. The model achieves this by establishing a baseline of communication pattern based on past communication between two systems and comparing it against the current communication pattern between the same two systems. The anomalous communication identified in this manner can be either lower or higher than the baseline. The anomalies lower than the baseline can be ignored and the ones which exceed the baseline are the ones that are of interest in identifying a lateral movement attempt.

Advantageously, one or more embodiments of the invention uses network flow logs to create a baseline for identifying anomalous network communication and lateral movement. Network flow logs capture the traffic information between various network interfaces in a network. Information captured in flow logs typically includes the source and destination IP addresses, the source and destination ports, the volume of data transmitted, TCP flags and timestamp.

According to at least one embodiment of the invention, once an anomalous communication is detected, the method can further comprise the step of determining a distance from the outlier threshold by calculating the difference between the IQR of current period and the outlier threshold.

The distance makes it possible to provide the analysts an idea of the deviation extent.

According to at least one embodiment of the invention, the past period can comprise past several days just before the current period. Preferably, in at least one embodiment, the past period can comprise seven days just before the current period. Furthermore, the given frequency can be one day such that one value of the metric is calculated per day.

Thus, the method according to at least one embodiment of the invention makes it possible to plot and track a pattern of usage for a configured time of seven days for example. At least one embodiment of the invention compares the seven days of metrics with current metric. As an output, the method determines, if Source IP and Destination IP as a combination is above the cutoff threshold for the previous seven days. If the usage behavior pattern is different, then the method flags it off as an anomaly.

According to one or more embodiments of the invention, the current period can be the current day. It is also possible to envisage the current period as several hours of the current day.

According to at least one embodiment of the invention, the metric can comprise the total number of in_bytes data of the network flow logs. The in_bytes metric is the total number of bytes that have been paged in.

According to at least one embodiment of the invention, the metric can comprise the total number of flow records of the network flow logs.

According to at least one embodiment of the invention, the metric can comprise the total number of connections of the network flow logs.

Preferably, in one or more embodiments, several metrics can be calculated, the anomalous communication is detected with respect to each metric. Accordingly, the sum(in_bytes), the sum(flow records) and the sum(connections) can be calculated separately, since each metric can give rise to an anomalous behavior on its own.

According to at least one embodiment of the invention, the outlier threshold can be calculated as being greater than 1.5 times the baseline. Advantageously, the outlier threshold is determined as being equal to 1.5 times the baseline. With this ratio, it has been noted a minimum of false positive.

According to one or more embodiments of the invention, when the Source IP address of the considered combination is mapped to an actual user, the method further can comprise the step of determining a user from the detection of the anomalous communication.

If the Source IP is mapped to an actual user in the organization, then the user whose behavior has changed can also be determined.

According to at least one embodiment of the invention, it is proposed a computer program comprising instructions which, when the program is executed by a processing unit, can cause the processing unit to carry out the steps of the method as described above.

At least one embodiment of the invention also concerns a non-transitory computer-readable storage medium encoded with computer-executable instructions which, when executed, perform the method as described above.

BRIEF DESCRIPTION OF DRAWINGS

Further advantages and characteristics of one or more embodiments of the invention will become apparent on examining the detailed description of an embodiment, which is in no way limitative, and the attached drawings, in which:

FIG. 4 is a table illustrating the calculation of the baseline according to one or more embodiments of the invention.

DETAILED DESCRIPTION OF THE INVENTION

Figure 1:
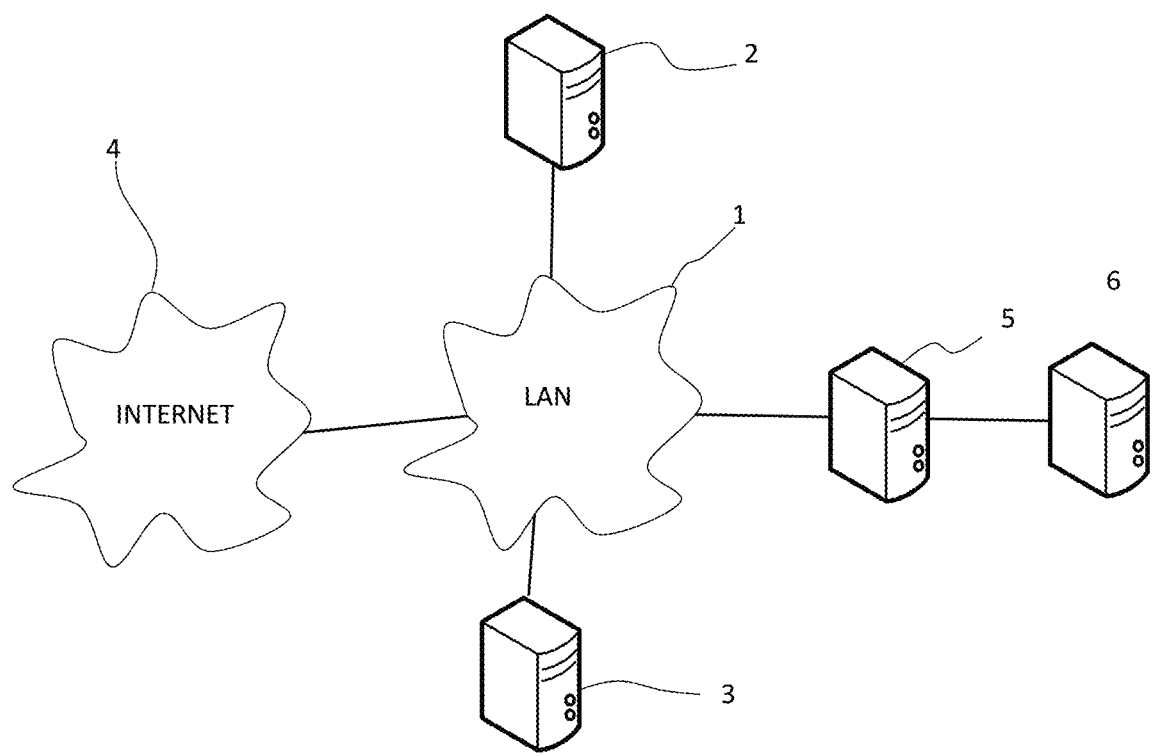
FIG. 1 is a schematic view of a system wherein the method according to one or more embodiments of the invention is carried out.

While one or more embodiments of the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of one or more embodiments of the invention as defined by the appended claims.

Hereinafter, the one or more embodiments of the invention will be described in detail by explaining exemplary embodiments of the invention with reference to the attached drawings.

In accordance with at least one embodiment, the method and system according to one or more embodiments of the invention relate to the following materials and processes:

Embodiments herein include computer-implemented methods, tangible non-transitory computer-readable mediums, and systems. The computer-implemented methods may be executed, for example, by a processor that receives instructions from a non-transitory computer-readable storage medium. Similarly, a system described herein may include at least one processor and memory, and the memory may be a non-transitory computer-readable storage medium. As used herein, a non-transitory computer-readable storage medium refers to any type of physical memory on which information or data readable by a processor may be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," may additionally refer to multiple structures, such a plurality of memories and/or computer-readable storage mediums. As referred to herein, a "memory" may comprise any type of computer-readable storage medium unless otherwise specified. A computer-readable storage medium may store instructions for execution by a processor, including instructions for causing the processor to perform steps or stages consistent with at least one embodiment herein. Additionally, one or more computer-readable storage mediums may be utilized in implementing a computer-implemented method. The term "computer-readable storage medium" should be understood to include tangible items and exclude carrier waves and transient signals.

FIG. 1 depicts a network comprising a local area network LAN 1 connecting several servers, among which server 2 and server 3. Servers are able to communicate together via the LAN 1 and with different machines outside the LAN, for example via Internet 4.

The exporter 5 is a router that collects IP network traffic between all interfaces of the network. The exporter 5 aggregates packets into flows and exports flow records towards a collector 6. The collector 6 is able to receive and store the flows data. The method according to one or more embodiments of the invention is implemented inside the collector 6 to analyze the received flow data.

The collector 6 is a server, a computer, a processing unit or any single machine or group of machines comprising hardware and software components such as for example a central processing unit (CPU), memory coupled to the CPU; and a computer readable storage medium coupled to the CPU; the storage medium containing instructions that are executed by the CPU via the memory to implement the method according to one or more embodiments of the invention.

At least one embodiment of the invention aims to analyze the traffic during the lateral movements phase in order to detect anomalous behavior of the systems. Indeed, a malware attack generates abnormal traffic. At least one embodiment invention uses a method which is particularly applied during the lateral movements.

The method according to one or more embodiments of the invention is able to identify anomalous network communication between server 2 and server 3 by analyzing the network flow logs. The aim is to define a baseline based on a study of previous flow logs. A comparison is then realized between current flow logs and the baseline. In other words, the method according to one or more embodiments of the invention is able to establish a baseline of communication pattern based on past communication between server 2 and server 3 and compare it against the current communication pattern between the same two servers. The anomalous communication identified in this manner can be either be lower or higher than the baseline. The anomalies lower than the baseline can be ignored and the ones which exceed the baseline are the ones that are of interest in identifying a lateral movement attempt.

Flow logs capture the traffic information between server 2 and server 3. Information captured in flow logs typically includes the source and destination IP addresses, the source and destination ports, the volume of data transmitted, TCP flags and timestamp.

For example, at least one embodiment of the invention can be implemented with the aid of the toolNetFlow of Cisco®, Jflow of Juniper, Qflow of Qradar, AWS VPC Flow logs, Azure NSG Flow logs or any other similar tools.

A flow is a sequence of packets that all share following values which define a unique key for the flow:
Ingress interface,
source IP address,
destination IP address,
IP protocol,
source port,
destination port,
IP type of service.

Figure 2:
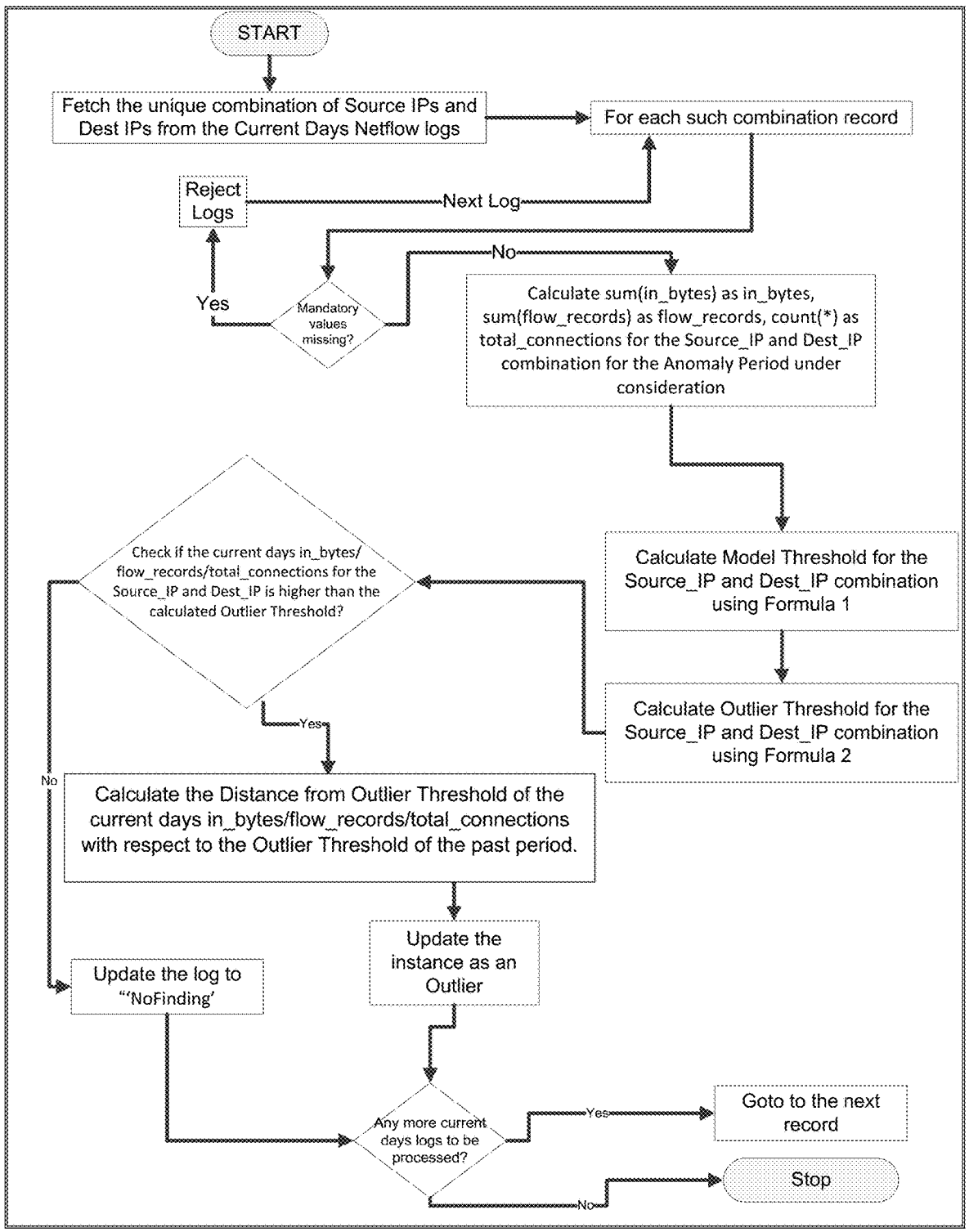
FIG. 2 is a schematic view of an organigram of the method according to one or more embodiments of the invention.

FIG. 2 is a schematic view of different steps of the method according to one or more embodiments of the invention.

The method is intended to analyze data of the network flow logs concerning the communication between server 2 and server 3.

The baseline computation can run at any periodicity for the purpose of training method. Preferably, in at least one embodiment, the baseline computation is run every day. When the baseline computation runs, it considers the logs stored in the system for the past "X" days. This "X" is a configurable parameter. Preferably, in at least one embodiment, the computation runs every day during the last seven days. It is also possible to consider a period of more than seven days, for example thirty days or between seven and thirty.

On step 7, the collector 6 fetches the unique combination of Source IPs and Destination IPs from the current days NetFlow logs. In the present case according to at least one embodiment, the combination is the server 2 and server 3. All data collected constitute a metadata.

For each combination record, a test is realized if mandatory values are missing at step 9. If yes, the current logs are rejected and next logs are considered for a new step 8. If no, the step 10 concerns a calculation of several metrics such as total number of in_bytes data, total number of flow_records and total number of connections for each day of the period of seven days for each unique combination of source and destination IP addresses.

Particularly, following metrics are determined for the Source IP, for example server 2, and the destination IP, for example server 3:

sum(in_bytes) is calculated as in_bytes, the in_bytes metric is the total number of bytes that have been paged in.

sum(flow_records) is calculated as flow_records. A flow record is defined when a new traffic is detected for an existing flow.

count(*) is calculated as total_connections for the Source IP and the destination IP combination.

For each day during the past seven days, a sum(in_bytes) is calculated, a sum(flow_records) is calculated, and a count(*) is calculated.

At step 11, the baseline is calculated for the combination server 2 with server 3 from all sum(in_bytes), sum(flow_records) and count(*) calculated during the past period. The baseline for anomaly detection is a threshold which is calculated as being the IQR (InterQuartile Range) of the metrics calculated for the combination of server 2 with server 3. The calculation of IQR is define in accordance with FIG. 3.

On FIG. 2, at step 12, an outlier threshold is calculated for the combination of server 2 with server 3 as follows:

Outlier threshold>1.5*baseline. Other values different from 1.5 can be used. 1.5 is the optimal value according to one or more embodiments of the invention as it reduces false positives.

Step 13 concerns the anomaly detection by comparing a new 1.5*IQR calculated from data of a current period. The current period to consider is for example a day directly after the seven day. It is possible to consider only some hours as current period. At step 13, the new 1.5*IQR is calculated based on current sum(in_bytes), current sum(flow_records) and current sum(connections) for the combination of server 2 with server 3. The IQR is calculated for each of the in_bytes, flow_records and connections. There are three comparisons. There is a check if the current day in_bytes/flow_records/total_connections is higher than the calculated outlier threshold.

In other words, in at least one embodiment, once the baseline is generated, the anomaly detection can run at any frequency. Preferably, in at least one embodiment, the anomaly detection is run daily. During each run, metadata is generated for the data pertaining to the current day. A comparison is done between the last computed baseline and the current day's volume. If the current day's volume is 1.5 times higher than the baselined for the IP addresses combination, then this is considered as an anomaly communication.

Once the anomalies are detected, it is also calculated at step 14 a "Distance from the Threshold" as information for the threat hunter to determine the extent of the anomaly. This distance is calculated as the difference between the outlier threshold and the new 1.5*IQR calculated for the current period.

At step 15, the instance is updated as an outlier.

At step 16, there is a check if any more current day logs are to be processed. If yes, a next record is called at step 17 to be analyzed. If no, this is the end at step 18.

Back to the step 13, if the check is negative, the log is updated to "Nofinding" at step 19, then the step 16 is carried out.

Figure 3:
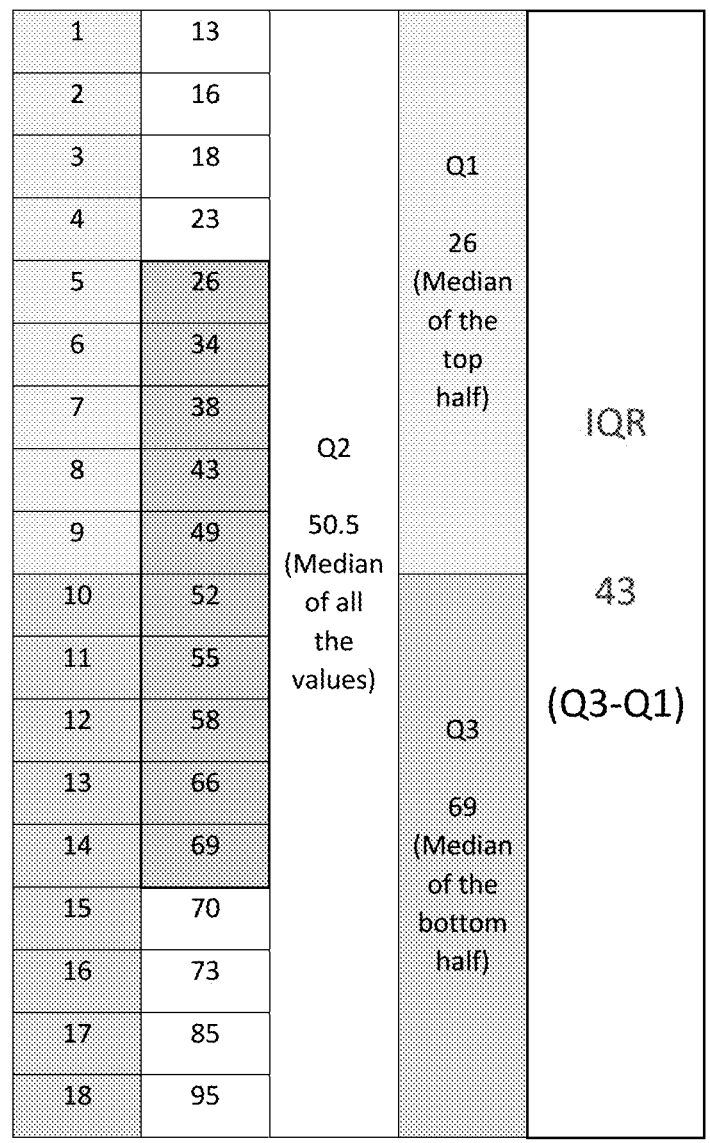
FIG. 3 is a schematic view illustrating a calculation of the interquartile range according to one or more embodiments of the invention.

FIG. 3 illustrate the calculation of the IQR according to one or more embodiments of the invention.

To determine the baseline from the historical communication patterns, the method according to one or more embodiments of the invention uses Interquartile Range (IQR). IQR is used for determining the distribution range of a dataset. In the present case, according to at least one embodiment, as part of the baselining, it is intended to determine if the values are spread out or not. This will effectively describe how consistent or inconsistent the communication patterns are and what are the medians and extremes of these patterns.

The IQR describes the middle 50% of values when ordered from lowest to highest. To find the Interquartile Range (IQR), the median of the lower and upper half of the data is first found. These values are Quartile 1 (Q1) and Quartile 3 (Q3). The IQR is the difference between Q3 and Q1.

The formula of calculating IQR for 7 days can be as follows:

Baseline=(PERCENTILE (7 days values, 0.75)–
PERCENTILE (7 days values, 0.25))

Where

PERCENTILE (7 days values, 0.75)=The third Quartile (Q3) of the specially processed 7 days of previous data PERCENTILE (7 days values, 0.25)=The first Quartile (Q1) of the specially processed 7 days of previous data 7 days values=(Packets/connections/flows transfer of day1), (data transfer of day2), (data transfer of day3), (data transfer of day4), (data transfer of day 5), (data transfer of day6), (data transfer of day7)

The table of FIG. 3 provides some sample values and how the IQR is calculated.

As described above, IQR gives the spread/distribution of data. Since communication anomalies due to sudden increase in activity are sought, the values which are in the Quadrant 3 or lower can be ignored and a focus can be done on the ones that are greater than Quadrant 3 (Q3).

Values only slightly greater than Q3 might not be significant enough to be considered as an anomaly. To reduce the count of false-positives and identify significant threats, it was decided to look for values greater than a factor of IQR. According to one or more embodiments of the invention, a factor of 1.5 times the IQR gives optimal results, i.e., it reduces false positives without creating a risk of false negatives.

FIG. 4 illustrates an example for packet based volumetric Anomaly, according to one or more embodiments of the invention. The example assumes a past period of 7 days. The day wise packets received in bytes are shown. This packet flow is between two IP Addresses, server 2 and server 3. In the example, the metric calculated is sum(in_bytes). This metric is calculated each day during the seven days. Based on these day wise numbers, the baseline concerning the sum(in_bytes) is determined by calculating the IQR. Then the Outlier Threshold is calculated as 1.5*IQR. The bytes received from the same set of IP Addresses for Day 8 (current day) is also shown. If this is greater than Outlier Threshold, the method flags it as an outlier.

The table also shows the distance from the Outlier Threshold to provide an idea of the deviation extent.

Numerous variations and modifications will become apparent to those skilled in the art once the above disclosure is fully appreciated.

The invention claimed is:

1. A method for detecting malware penetrating a network by identifying anomalous communication between at least two systems of the network, the method being carried out by a computer and for each unique combination of Source IP address and destination IP address, the method comprising:
considering a past period,
considering network flow logs stored during said past period,
calculating values of a metric based on data of the network flow logs within the past period and at a given frequency,
calculating a baseline which consists in calculating an interquartile range (IQR) of all metric values calculated during the past period,
determining an outlier threshold from the baseline,
considering a current period,
considering the network flow logs stored during said current period,
calculating values of the metric based on data of the network flow logs within the current period,
calculating the IQR of all metric values calculated during the current period, and
classifying a communication between the at least two systems of the network of the each unique combination as an anomalous communication if the IQR of the current period is greater than the outlier threshold.

2. The method according to claim 1, wherein, once the anomalous communication is detected, further comprising determining a distance from the outlier threshold by calculating a difference between the IQR of the current period and the outlier threshold.

3. The method according to claim 1, wherein the past period comprises past several days just before the current period.

4. The method according to claim 1, wherein the past period comprises seven days just before the current period.

5. The method according to claim 1, wherein the given frequency is one day such that one value of the metric is calculated per day.

6. The method according to claim 1, wherein the current period is a current day.

7. The method according to claim 1, wherein the metric comprises a total number of in_bytes data of the network flow logs.

8. The method according to claim 1, wherein the metric comprises a total number of flow records of the network flow logs.

9. The method according to claim 1, wherein the metric comprises a total number of connections of the network flow logs.

10. The method according to claim 1, further comprising calculating several metrics, wherein the anomalous communication is detected with respect to each metric of said several metrics.

11. The method according to claim 1, wherein the outlier threshold is calculated as being greater or equal to 1.5 times the baseline.

12. The method according to claim 1, wherein, when the Source IP address of the each unique combination is mapped to an actual user, the method further comprising determining a user from the anomalous communication that is detected.

13. A computer program comprising instructions which, when the computer program is executed by a processing unit, cause the processing unit to carry out a method for detecting malware penetrating a network by identifying anomalous communication between at least two systems of the network, the method being carried out by a computer and for each unique combination of Source IP address and destination IP address, the method comprising:
considering a past period, considering network flow logs stored during said past period, calculating values of a metric based on data of the network flow logs within the past period and at a given frequency, calculating a baseline which consists in calculating an interquartile range (IQR) of all metric values calculated during the past period, determining an outlier threshold from the baseline, considering a current period, considering the network flow logs stored during said current period, calculating values of the metric based on data of the network flow logs within the current period, calculating the IQR of all metric values calculated during the current period, and classifying a communication between the at least two systems of the network of the each unique combination as an anomalous communication if the IQR of the current period is greater than the outlier threshold.

14. A non-transitory computer-readable storage medium encoded with computer-executable instructions which, when executed, perform a method for detecting malware penetrating a network by identifying anomalous communication between at least two systems of the network, the method being carried out by a computer and for each unique combination of Source IP address and destination IP address, the method comprising:

considering a past period, considering network flow logs stored during said past period, calculating values of a metric based on data of the network flow logs within the past period and at a given frequency, calculating a baseline which consists in calculating an interquartile range (IQR) of all metric values calculated during the past period, determining an outlier threshold from the baseline, considering a current period, considering the network flow logs stored during said current period, calculating values of the metric based on data of the network flow logs within the current period, calculating the IQR of all metric values calculated during the current period, and classifying a communication between the at least two systems of the network of the each unique combination as an anomalous communication if the IQR of the current period is greater than the outlier threshold.

\* \* \* \* \*